United States Patent [19]

Bauer et al.

[11] Patent Number: 4,930,154

[45] Date of Patent: May 29, 1990

[54] AUDIBLE LOGO FOR IDENTIFYING A COMMON CARRIER

[75] Inventors: Thomas M. Bauer, Belle Mead; Thomas A. Dunn, Edison, both of N.J.; Christina M. Gurke, Naperville, Ill.; John W. Hopkins, Woodridge, Ill.; Richard D. Nafziger, Wheaton, Ill.

[73] Assignee: AT&T Bell Laboratories, Murray Hill, N.J.

[21] Appl. No.: 341,458

[22] Filed: Apr. 21, 1989

[51] Int. Cl.$^5$ ............................................. H04M 3/42
[52] U.S. Cl. ...................................... 379/246; 379/88; 379/260; 379/201
[58] Field of Search ............... 379/260, 245, 246, 243, 379/263, 201, 213, 214, 210, 218, 221, 220, 240, 67, 88

[56] References Cited

U.S. PATENT DOCUMENTS 4,783,796 11/1988 Ladd ................................. 379/214 X

OTHER PUBLICATIONS

M. Berger et al., "Automated Coin Toll Service: Overall Description and Operational Characteristics", The Bell System Technical Journal, TSPS No. 1, vol. 58, No. 6, Part 1 of 2, Jul.-Aug. 1979, pp. 1207–1223.

Primary Examiner—James L. Dwyer
Attorney, Agent, or Firm—Werner Ulrich

[57] ABSTRACT

This invention relates to the application of an audible logo to a telecommunications call, for identifying the common carrier serving that call. A call is received in an operator assistance system. After applying a calling card prompt tone and prior to connecting the call to an operator position or receiving further digits such as those for a calling card number, the operator assistance system connects an audible logo, identifying a common carrier, to the call. Advantageously, a telephone customer receives the information necessary to identify whether his/her preferred common carrier is going to be used on this call at a sufficiently early time to make it convenient to disconnect and reoriginate. This information is particularly important for calls originated away from home or office, calls that are likely to be operator assistance 0 or 0+ directory number) calls. Subsequently, the operator assistance call is processed as in the prior art. Advantageously, this arrangement identifies the common carrier on the calls where this identification is most needed without adding holding time to all direct dialed station toll calls.

30 Claims, 3 Drawing Sheets

AUDIBLE LOGO FOR IDENTIFYING A COMMON CARRIER

Technical Field

This invention relates to arrangements for identifying a telecommunications common carrier to a customer.

Problem

Until the late 1970's there was essentially no competition for public switched toll carrier service. A customer would dial or key a toll call and would automatically be routed either directly over AT&T facilities or over the facilities of another toll carrier connected to that customer's local switch. In the late 1970's it became possible for telephone customers to use an alternate carrier such as MCI by dialing an access code to access the alternate carrier. With the AT&T divestiture, the separation of the local and toll services, and the requirement for equal access to toll carriers, it became necessary for local carriers to arrange for customer dialed toll calls to be routed automatically over a customer selected toll carrier without dialing access codes. The specific method selected to implement equal access was to permit each telephone customer to select a favored carrier who would, in the absence of alternate signals, carry that customer's toll calls. If that customer wanted, on a specific toll call, to use an alternate carrier, the customer could do so by dialing a special preliminary code identifying that alternate carrier and then dialing the toll call.

These arrangements are satisfactory for ensuring that calls initiated by customers from their own homes or businesses are carried by the carrier of their choice. However, when a customer is away from home, for example, in a hotel, the customer dialing the call may be routed over another carrier, i.e., the carrier of choice of the hotel where he/she is staying. In such cases, the customer's call is routed over a carrier not of his choice without the customer realizing that this is happening. Upon receipt of a monthly bill, the customer finds that part of the bill is for calls placed over an alternate carrier. This alternate carrier is, in many cases, much more expensive than the customer's favored carrier and the customer is deeply dissatisfied, albeit too late to avoid or dispute the charges or to have avoided the use of the alternate carrier. Of course the preferred carrier is equally dissatisfied for having lost the business. While some carriers have thanked the customer by announcing, prior to completing the call, "Thank you for using (name of carrier)", this announcement is made late in the call after substantial toll service customer data transfer, interaction with a human operator, and even call routing has been completed, too late for many customers to consider disconnecting and reoriginating. A problem of the prior art, therefore, is that there are no facilities for customers to be made aware automatically, at an early stage of the setting up of a call, that they are using or not using a particular telecommunications toll common carrier, to afford an opportunity to avoid using an undesired carrier and potentially incurring high charges for call service, especially on calls originated away from their home or business.

Solution

In accordance with the principles of an illustrative embodiment of this invention, a carrier transmits a distinctive audible signal, an audible logo, upon receipt of a call from a local exchange carrier and before either any charge data transmission from a customer to the common carrier or the call is extended to an operator position. The presence or absence of the distinctive audible logo enables a caller promptly to terminate the call and see to its processing by the desired common carrier. As a consequence, the caller obtains service features and call charges of the preferred carrier.

It is especially important to provide this audible logo for 0+ (operator assistance) calls. Such calls are processed in special operator assistance systems or subsystems, referred to hereinafter as systems, such as AT&T's Traffic Service Position System (TSPS) and Operator Services Position System (OSPS). Most of the calls that customers place when they are away from their home or business are 0+ calls, which include: coin sent-paid, calling card calls, bill to third party calls, and collect calls; the person-to-person variant of each of these calls; and sent-paid person-to-person calls. Such calls typically require that the customer provide additional information such as a calling card or a verbal identification of the nature of the call being placed. Consequently, such calls require that the calling customer be connected to an operator position or to a facility for announcing prompts and accepting dual tone multifrequency (DTMF) input dialed by the customer. In accordance with one aspect of the invention, an audible logo is extended to the call prior to collecting calling card digits or connecting an operator position, to inform the customer that he/she is to be served by a specified carrier.

In accordance with one specific implementation of the invention, each 0+ call routed to an operator assistance switching system is connected to facilities which supply the audible logo to the caller immediately after the conventional Automated Calling Card Service (ACCS) prompt tone ("bong"). Advantageously, the system used to provide prompt tone is readily adaptable to provide the audible logo.

In accordance with one aspect of applicants' invention, the audible logo is connected before the customer dials a calling card number and before the customer is connected, when necessary, to an operator position. Advantageously, such an arrangement allows the customer to disconnect because no logo or an unwanted logo is heard, before call processing is far advanced, and before the customer is connected to a human operator, thus making it possible for the customer to disconnect before he or she is reluctant to do so.

In accordance with another aspect of applicants' invention, each of a plurality of common carriers has an associated audible logo and the audible logo for the selected common carrier is connected to the caller. Advantageously, such an arrangement permits each of a plurality of common carriers to be identified to the caller.

In accordance with another aspect of applicants' invention, if the caller dials digits such as a calling card number while the audible logo is connected, the audible logo will be removed. Advantageously, after customers have become used to a particular logo, they will be able to continue their dialing as soon as they hear the first identifiable part of that audible logo.

In accordance with another aspect of the invention, if one or more of the plurality of common carriers does not have an associated audible logo, the audible logo is bypassed for that carrier.

Information for determining which carrier is to serve a particular call is provided either directly from the local or tandem access system processing the call; in some cases, the carrier is determined from a combination of such information and a further determination of whether a local carrier or a toll carrier is required for this particular call by examining the call destination and the directory number, identified by automatic number identification, of the calling customer.

Accordingly, this invention relates to arrangements for applying an audible logo for identifying a common carrier for serving a call, and for applying the audible logo prior to connection to an operator position or to dialing billing information.

Detailed Description

Applicant's invention is implemented in one specific embodiment in a Traffic Service Position System (TSPS) for processing operator assistance calls; an essentially similar arrangement is also being implemented for the Operator Services Position System (OSPS) of the 5ESS® switch. The specific implementation of applicants' invention discussed herein is that in the TSPS. When a customer dials 0 or 0+ (signifying 0 plus the directory number of the desired destination), the customer is routed directly from a local switching system or via an access tandem system to a TSPS for handling operator or automated operator functions. The call is then completed via a toll circuit to a toll switching system which routes the call to its destination. The TSPS is described extensively in *The Bell System Technical Journal*, Vol. 49, 1970, pages 2417-2731. The specific embodiment uses an adaptation of the announcement and tone detection facilities provided for implementing Automated Coin Toll Service described in *The Bell System Technical Journal*, Vol. 58, 1979, pages 1207-1290. Automated Calling Card Service (ACCS) which has been in use since 1980, permits a customer to dial a calling card number for a calling card call and have the call completed without requiring the assistance of an operator. Automated Calling Card Service is described in *The Bell System Technical Journal*, Vol. 61, Number 7, Part 3, Sept. 1982, pages 1655-1714.

Figure 1:
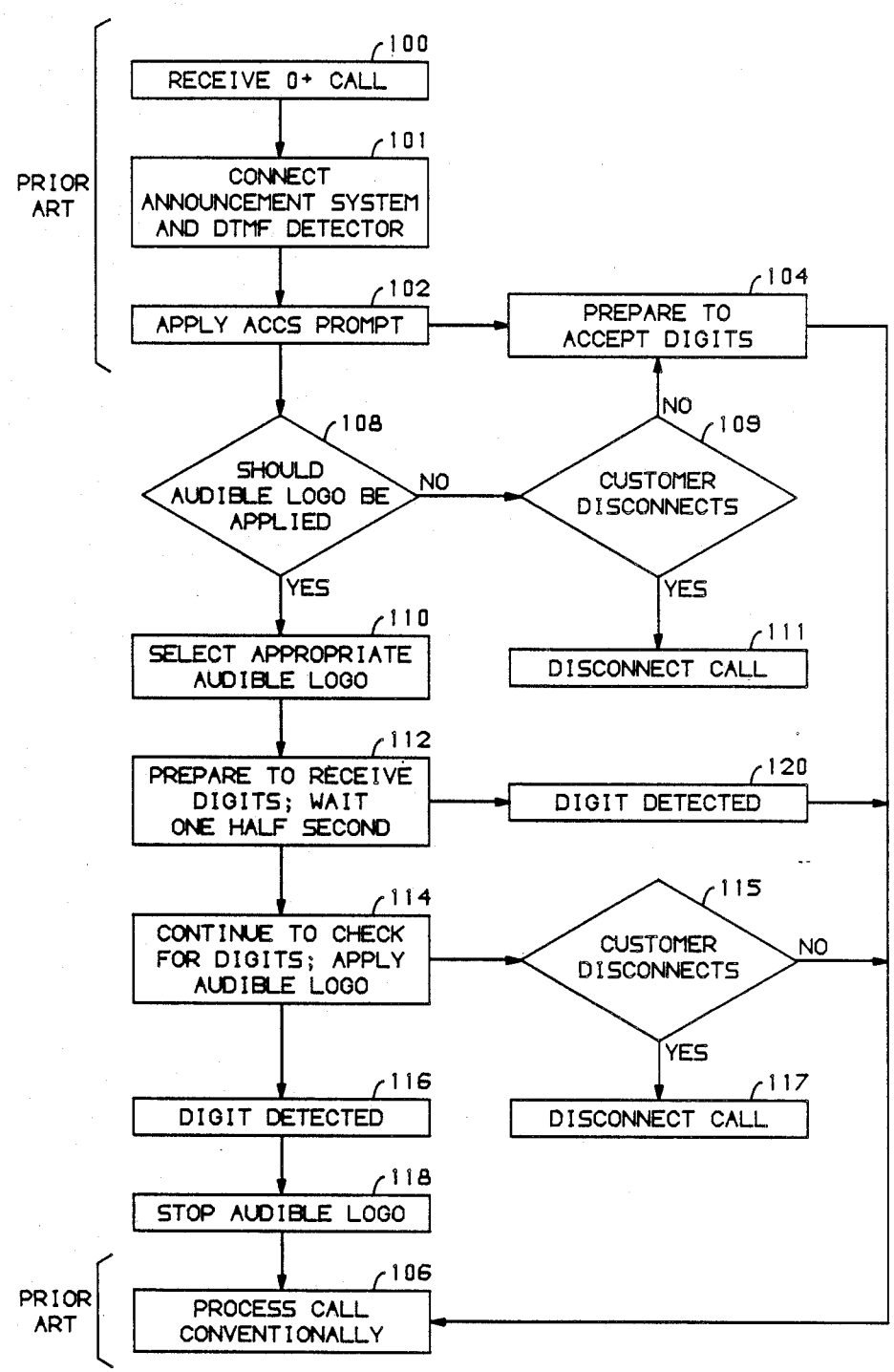
FIG. 1 is a flow chart of a method for applying an audible logo.

As shown in FIG. 1, the TSPS receives a 0+ call (action block 100), connects an announcement system and DTMF detector to the call (action block 101), and applies the ACCS prompt tone, or, more generally, a prompt tone, to the call (action block 102). Thereafter, the TSPS checks for digits dialed by the customer and received in the DTMF detector (action block 104). The subsequent actions are summarized for the purpose of FIG. 1 in block 106 (process call conventionally). Briefly, if the customer dials another 0, or does not dial any digits within a certain time period, then an operator position with an operator is immediately attached to the call and further processing of the call is under the control of the operator. If the customer dials a calling card number, the number is validated and if not valid the customer is given a rejection announcement. If the number is valid, it is recorded for billing purposes and the call is then completed without attaching an operator position. (The term "dial" with respect to a 0+ call received as in FIG. 1 (action block 100) is used herein to refer to the use of a dual tone multifrequency (DTMF) telephone or an automatic card dialer telephone. With respect to access to an operator system, the term "dial" would include the use of rotary dial telephones; for operator assistance calls when a dial pulse telephone is used, the digits are usually detected in the local office and sent to the operator assistance system as tone signals. However, once the call is connected to the operator system, dial pulse telephones cannot be used to provide additional digit signaling to the operator system, e.g., ACCS card number dialing.)

In accordance with applicants' invention this sequence is modified after action block 102 to make a test 108 whether the audible logo should be applied. This test is based on information received from the local office or access tandem office designating which toll carrier will complete this call or by determining the designated carrier internally in the TSPS based on the originating and destination customer directory numbers. In the specific embodiment, initially, the audible logo will then be applied to those calls which are to be completed over AT&T facilities. More broadly, in the future, this same arrangement can be used to specify one of a plurality of audible logos for one of a plurality of designated carriers. If no audible logo is to be applied, then, if the customer disconnects because no carrier logo has been heard (test 109) the call is disconnected; otherwise the actions previously described with respect to blocks 104 and 106 are completed. If an audible logo is to be applied, the proper audible logo is selected (action block 110), and a 0.5 second wait is introduced (action block 112). The 0.5 second wait is introduced because certain automatic dialing machines wait for 0.5 seconds of silence, following reception of the ACCS prompt tone, before dialing a calling card number, as a method of preventing certain types of fraud. If, at any time during that 0.5 second interval a digit is detected (action block 120), the conventional call processing of action block 106 is continued. If no digits are detected during the 0.5 second interval, the audible logo is applied while still checking for the reception of digits (action block 114). If in response to the logo, the customer disconnects (test 115), then the call is disconnected (action block 117) and the customer can try some other way to complete the call using a carrier of his/her choice. After the audible logo has been applied, the call is processed conventionally (action block 106). If, during the application of the audible logo a digit is detected (action block 116), then the audible logo is stopped (action block 118) and the call is thereafter processed conventionally (action block 106).

Figure 2:
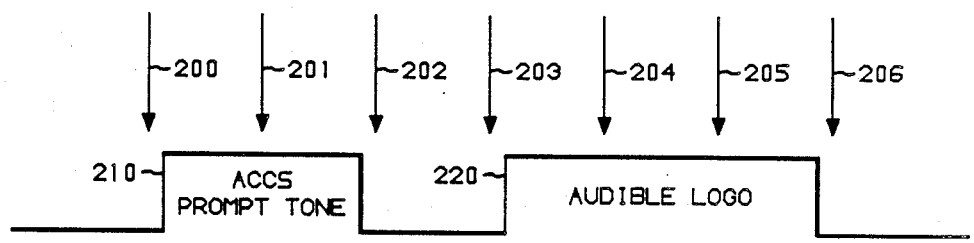
FIG. 2 is a timing diagram illustrating the relative timing of the application of a prompt tone and the audible logo.

FIG. 2 is a timing diagram illustrating the timing of the application of the ACCS prompt tone 210 and the audible logo 220. The basic timing for announcements in TSPS is controlled by a 512 millisecond clock (nominally 0.5 second). Successive occurrences of this clock are shown as arrows 200, 201, 202, 203, 204, 205, and 206. After a call is received, an ACCS prompt tone 210 is initially applied following the beginning of a 512 millisecond interval 200. The ACCS prompt tone terminates before the second successive time interval 202 begins. Following timing interval 203 to allow for the 0.5 second wait, the audible logo 220 is applied and completed prior to the occurrence of timing marker 206 which occurs approximately 1.5 seconds later.

The ACCS prompt tone comprises a short burst (approximately 60 milliseconds) of the DTMF signal correspondencing to the pound (#) sign followed by a 0.9 second decaying dial tone signal. This makes detection of digits during the application of the prompt tone undesirable, since reflections from the pound sign DTMF signal may falsely trigger the DTMF detector.

In the specific implementation of applicants' invention the audible logo comprises a male voice announcement of the words "AT&T" overlaid on a sequence of tonal notes. Any other audible logo could be used with equal ease. It is desirable that the audible logo not contain large components of any DTMF signal since this would mean that it would not be possible to check for digits while the audible logo is being announced.

As described in the references on Automated Coin Toll Service, signals such as announcements and an audible logo are stored in digital form in a memory of the TSPS and are selected in sequences of 0.5 second segments to synthesize announcements or multisegment signals. Thus, providing one or more audible logos requires storing the digital signals representing each logo, and selecting the appropriate set of segments for applying the correct logo to a call.

Figure 3:
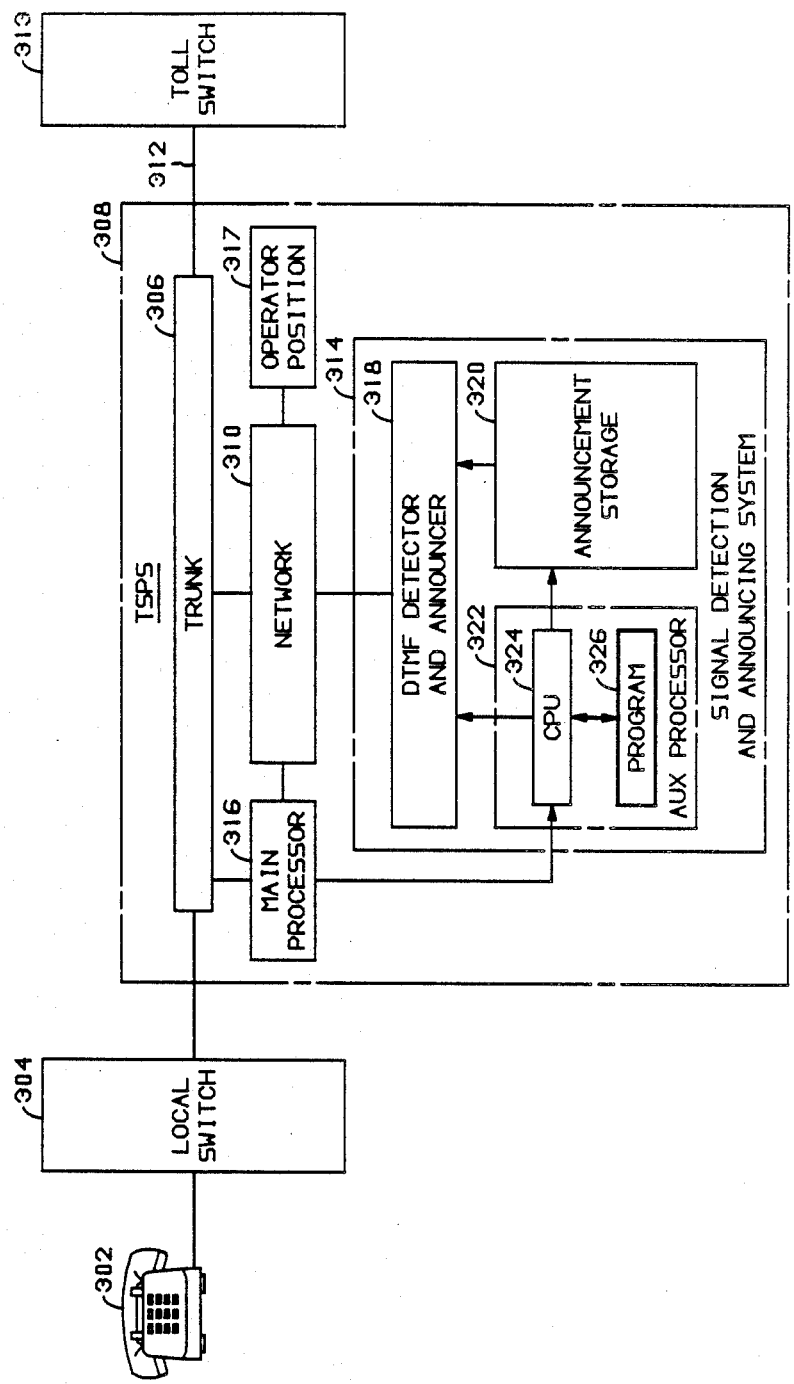
FIG. 3 illustrates the use of a TSPS to apply the audible logo.

FIG. 3 is a diagram illustrating the operation of applicants' invention. A customer dials a 0+ call from a telephone station 302 connected to a local switch 304. Local switch 304 extends the call to a truck circuit 306 in TSPS 308. Trunk circuit 306 is a three port trunk circuit connected to local switch 304, a switching network 310 in the TSPS, and a toll circuit 312 connected to a toll switch 313. The TSPS is controlled by a stored program controlled main processor 316. Also connected to network 310 are operator positions such as operator position 317 and a signal detection and announcement system 314. When the call is originally received from local switch 304, it is connected through network 310 to this signal detection and announcement system 314. System 314 comprises DTMF detection circuits and announcement circuits 318 for detecting DTMF digits and applying tones, announcements, and special signals such as the audible logo to a call. The digital data representing the tones, announcements and special signals to be applied are stored in announcement store 320. In order to implement applicants' invention, the announcement store 320 is loaded with digital data representing the audible logo. Signal detection and announcement system 314 is controlled by an auxiliary processor 322 comprising a central processing unit 324 and a program 326. In order to implements applicants' invention, program 326 is changed to include the new program steps described in FIG. 1. The main processor 316 provides information to the auxiliary processor 322 for identifying which, if any, audible logo, is to be applied. When the audible logo is to be applied, the auxiliary processor 322 signals the DTMF detector and announcement circuit 318 to accept input from announcement store 320 and signals announcement store 320 to provide the input representing the selected audible logo. When digits are detected in DTMF detector and announcement circuit 318, the audible logo is terminated. After all appropriate digits have been received, the call is either directly completed through trunk 306 and toll circuit 312 to toll switch 313 or is first connected via network 310 to operator position 317 for further processing under the control of an operator.

It is to be understood that the above description is only of one preferred embodiment of the invention. Numerous other arrangements may be devised by one skilled in the art without departing from the spirit and scope of the invention. The invention is thus limited only as defined in the accompanying claims.

I claim:

1. A method of processing a call from an originating customer to a terminating customer station over one of a plurality of common carrier networks, comprising the steps of:
   responsive to receipt of a toll call, determining the identity of one of said common carriers for serving said toll call;
   responsive to said determining, establishing a connection for said call to a common carrier switch serving said one common carrier;
   in said switch, responsive to said determining, prior to connecting said call to an operator position and prior to receipt of billing information from said originating customer, connecting said call to a source of an audible logo identifying said carrier.

2. The method of claim 1 wherein said connecting step further comprises:
   responsive to information identifying said carrier, selecting said one of a plurality of audible logos corresponding to said carriers.

3. The method of claim 1, further comprising:
   prior to connecting said source of an audible logo, connecting said call to a source of prompt tone.

4. The method of claim 3, further comprising:
   prior to connecting said source of an audible logo, and after said step of connecting said source of prompt tone, waiting for a prespecified interval.

5. The method of claim 1, further comprising the steps of:
   applying said audible logo;
   monitoring said call to detect customer dialed digits; and
   responsive to detecting said customer digits, removing said source of audible logo.

6. The method of claim 1, further comprising the steps of:
   prior to connecting said source of audible logo, testing whether said audible logo should be applied; and
   if said test determines that said audible logl should not be applied, bypassing said step of connecting said source of audible logo.

7. The method of claim 6 wherein said testing step comprises:
   testing whether said call is to be completed using a carrier having a logo that can be applied.

8. The method of claim 1 wherein said establishing comprises:
   transmitting, from a local switch, data for determining which carrier is to carry said call.

9. The method of claim 1 wherein said connecting step further comprises:
   in said switch, selecting one of a plurality of audible logos based on information identifying a carrier, said information received from a local or access tandem switch.

10. The method of claim 1 further comprising the step of:
    responsive to said connecting to said source of said logo and under the control of said originating customer, disconnecting said call or proceeding with processing said call.

11. In an operator assistance system comprising an operator position, means for applying an audible logo to a call connection comprising:
means for generating an audible logo;
means for connecting said call to an operator position; and
processor means, operative under the control of a program, for controlling connection of an audible logo generated by said means for generating to said call connection prior to connecting said call to an operator position by said means for connecting and prior to receipt of billing information dialed by a caller of said call.

12. In the system of claim 11, the processor means further operative under the control of said program for connecting said call to a source of prompt tone prior to said connection of said audible logo.

13. In the system of claim 12, the processor means further operative under the control of said program for waiting a prespecified interval after said connecting to a source of prompt tone and prior to said connection of said audible logo.

14. In the system of claim 11, the processor means further operative under the control of said program for selecting one of a plurality of audible logos for connection to said call.

15. In the system of claim 11, the processor means further operative under the control of said program for selecting one of a plurality of audible logos based on information identifying a carrier received for said call from a local or access tandem switch.

16. In the system of claim 11, the processor means further operative under the control of said program for monitoring said call to detect customer dialed digits during connection of said audible logo and responsive to detecting said customer digits, removing said audible logo.

17. In the system of claim 11, the processor means further operative under the control of said program for testing whether said audible logo should be connected prior to connecting said audible logo and if said test determines that said audible logo should not be applied, bypassing the connection of said audible logo.

18. In the system of claim 17, the processor means further operative under the control of said program for testing whether said audible logo should be applied by testing whether said call is to be completed using a carrier having a logo that can be applied in said system.

19. In the system of claim 17, the processor means further operative under the control of said program for testing whether said audible logo should be applied on the basis of information, received from a local switch, for determining which carrier is to carry said call.

20. In the system of claim 11, the processor means further operative under the control of said program and in response to supervisory signals from a caller generated in response to hearing said audible logo, for disconnecting said call or proceeding with processing of said call.

21. A call processing arrangement for processing an operator assistance call comprising:
means responsive to a toll operator assistance call for controlling a routing of said call to a common carrier network for service; and
means for communicating an audible logo identifying said common carrier network toward a call prior to connecting said call to an operator position.

22. A call processing arrangement for processing a station-to-station calling card call comprising:
means responsive to a receipt of said calling card call for controlling a routing of said call to a common carrier network for service; and
means for communicating an audible logo identifying said common carrier network toward a caller prior to receipt of billing information from said caller.

23. A call processing method comprising the steps of:
responsive to receipt of a toll call, determining the identity of a common carrier network for serving said toll call;
establishing a connection for said call to a switch serving said one common carrier; and
in said switch, communicating an audible logo identifying said common carrier toward a caller prior to extension of said call to an operator position or to receipt of billing information from said caller.

24. In a system having:
means for extending toll calls selectively to one of a plurality of common carrier networks;
the improvement comprising:
means responsive to a receipt of one of said toll calls and data identifying one of said plurality of common carriers for communicating an audible logo for identifying said one of said carriers to said call for enabling a caller selectively to terminate or continue an extension of said call to said one of said carriers prior to receipt of billing information from said caller and to extension of said call to an operator position.

25. The system of claim 24 wherein said communicating means comprises means for generating an audible logo and means for connecting said audible logo to said call prior to receipt of billing information from said caller and to extension of said call to an operator position.

26. A call processing arrangement comprising:
means for generating a plurality of audible logos each for identifying one of a plurality of common carriers; and
means responsive to a receipt of a call and common carrier identifying information for connecting one of said plurality of generated audible logos corresponding to a carrier identified by said carrier identifying information from said generating means to said received call.

27. A call processing method comprising:
routing a call to an operator assistance system;
connecting said call to a source of prompt tone;
waiting for a prespecified interval;
receiving data for determining which of a plurality of common carriers is to carry said call;
determining whether an audible logo corresponding to said determined carrier can be generated;
if it is determined that an audible logo corresponding to said carrier can be generated, following said waiting step, communicating said audible logo of said determined carrier to said call;
bypassing said step of communicating for others of said carrier;
receiving customer dialed digits in an overlapping with said communicating of said audible logo.

28. The method of claim 27 further comprising the steps of:

responsive to said communication of said audible logo and under control of said calling customer, disconnecting said call or proceeding with processing of said call.

29. The method of claim 27 further comprising the steps of:

responsive to receipt of said prompt tone, said customer dialing a calling card number; and routing said call over said common carrier identified by said audible logo.

30. The method of claim 27 wherein said communicating step comprises the step of:

terminating said communicating of said logo in response to receipt of a prescribed number of customer dialed digits.

* * * * *

UNITED STATES PATENT AND TRADEMARK OFFICE
CERTIFICATE OF CORRECTION

PATENT NO.   :   4,930,154

DATED        :   May 29, 1990

INVENTOR(S)  :   Thomas M. Bauer, Thomas A. Dunn, C. M. Gurke,
                 John W. Hopkins, Richard D. Nafziger It is certified that error appears in the above-identified patent and that said Letters Patent is hereby corrected as shown below:

Claim 6, column 6, line 48, delete "logl" and substitute --logo--.

Signed and Sealed this

Fourth Day of February, 1992

Attest:

HARRY F. MANBECK, JR.

*Attesting Officer*     *Commissioner of Patents and Trademarks*